(12) United States Patent
Unruh

(10) Patent No.: US 6,775,860 B2
(45) Date of Patent: Aug. 17, 2004

(54) TRAILER HITCH PORTABLE TOILET AND CAMP CHAIR AND HAVING A PORTABLE AMBIDEXTROUS RETRACTABLE TOILET TISSUE HOLDER AND METHOD THEREFOR

(76) Inventor: Edward Thomas Unruh, 11545 N. Frank Lloyd Wright, Apt. 2102, Scottsdale, AZ (US) 85259-3160

(*) Notice: Subject to any disclaimer, the term of this patent is extended or adjusted under 35 U.S.C. 154(b) by 0 days.

(21) Appl. No.: 10/412,776

(22) Filed: Apr. 11, 2003

(65) Prior Publication Data

US 2003/0192113 A1 Oct. 16, 2003

Related U.S. Application Data

(60) Provisional application No. 60/372,169, filed on Apr. 12, 2002.

(51) Int. Cl.⁷ ................................................. E04H 1/12
(52) U.S. Cl. .................... 4/460; 4/458; 4/479; 224/519
(58) Field of Search ........................... 4/449, 458, 460, 4/479, 483, 484; 2224/518–521, 511

(56) References Cited

U.S. PATENT DOCUMENTS

| | | | | | |
|---|---|---|---|---|---|
| 3,992,727 A | * | 11/1976 | Elkins | ........................... | 4/311 |
| 5,083,324 A | * | 1/1992 | Strong | ........................... | 4/460 |
| 6,023,792 A | * | 2/2000 | Croucher et al. | .............. | 4/484 |
| 6,081,941 A | * | 7/2000 | Beck, Jr. | ....................... | 4/460 |
| 6,125,480 A | | 10/2000 | Soffar et al. | | |
| 6,571,402 B1 | * | 6/2003 | Dobron | ......................... | 4/460 |

* cited by examiner

*Primary Examiner*—Henry Bennett
*Assistant Examiner*—Amanda Flynn
(74) *Attorney, Agent, or Firm*—Jeffrey D. Moy; Harry M. Weiss, P.C.; Weiss, Moy & Harris, P.C.

(57) ABSTRACT

A portable toilet has a support stem which may be inserted into a trailer hitch. A base ring is coupled to the support stem. An attachment device is coupled to the base ring. The attachment device is used for removably coupling a waste collection bag to the portable toilet. A toilet seat assembly is coupled to the support stem and rests on the base ring. A multi positional toilet paper holder is coupled to the support stem.

11 Claims, 5 Drawing Sheets

TRAILER HITCH PORTABLE TOILET AND CAMP CHAIR AND HAVING A PORTABLE AMBIDEXTROUS RETRACTABLE TOILET TISSUE HOLDER AND METHOD THEREFOR

RELATED APPLICATIONS

This patent application claims the benefit of U.S. Provisional Application entitled "THE PORTABLE AMBIDEXTROUS, RETRACTABLE, ACCESSORY TOILET TISSUE HOLDER;" having an application no. 60/372,169; filed on Apr. 12, 2002 in the name of Edward Thomas Unruh.

BACKGROUND OF THE INVENTION

1. Field of the Invention

This invention relates generally to a portable toilet and, more specifically, to a portable toilet which may be mounted on a trailer hitch and which has a portable ambidextrous, retractable, accessory toilet tissue holder.

2. Description of the Prior Art

Many outdoor activities like hiking, camping, and the like, takes people away from the comforts of civilization. People travel to remote areas in their cars and find themselves far from such comforts as electricity and plumbing. In the past, when one needed to use the bathroom while participating in outdoor activities, they were limited to the use of self-standing and self-supporting portable toilets, or the nearest available bush. The drawbacks of such choices is the lack of weight support and stability, the limited availability thereof, the unsanitary conditions which are often present, and the uncomfortable, awkward and sometimes messy method of going to the bathroom without the benefit of a portable toilet.

Therefore, a need existed to provide an improved portable toilet. The improved portable toilet would overcome the problems associated with prior art portable toilets. The improved portable toilet will be more stable than prior art portable toilets. The improved portable toilet will also be more sanitary than prior art portable toilets.

SUMMARY OF THE INVENTION

In accordance with one embodiment of the present invention, it is an object of the present invention to provide an improved portable toilet.

It is another object of the present invention to provide an improved portable toilet would overcome the problems associated with prior art portable toilets.

It is still another object of the present invention to provide an improved portable toilet will be more stable than prior art portable toilets.

It is yet another object of the present invention to provide an improved portable toilet will also be more sanitary than prior art portable toilets.

BRIEF DESCRIPTION OF THE EMBODIMENTS

In accordance with one embodiment of the present invention, a portable toilet is disclosed. The portable toilet has a support stem which may be inserted into a trailer hitch. A base ring is coupled to the support stem. An attachment device is coupled to the base ring. The attachment device is used for removably coupling a waste collection bag to the portable toilet. A toilet seat assembly is coupled to the support stem and rests on the base ring. A multi positional toilet paper holder is coupled to the support stem.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Referring to FIGS. 1–4, a portable toilet which may be mounted on a trailer hitch and which has a portable ambidextrous, retractable, accessory toilet tissue holder 10 (hereinafter portable toilet 10) will be described. The portable toilet 10 may be attached to any trailer hitch or a trailer tongue. This will provide a stable platform in which any person, large or small, may be able to use the portable toilet 10.

Figure 1:
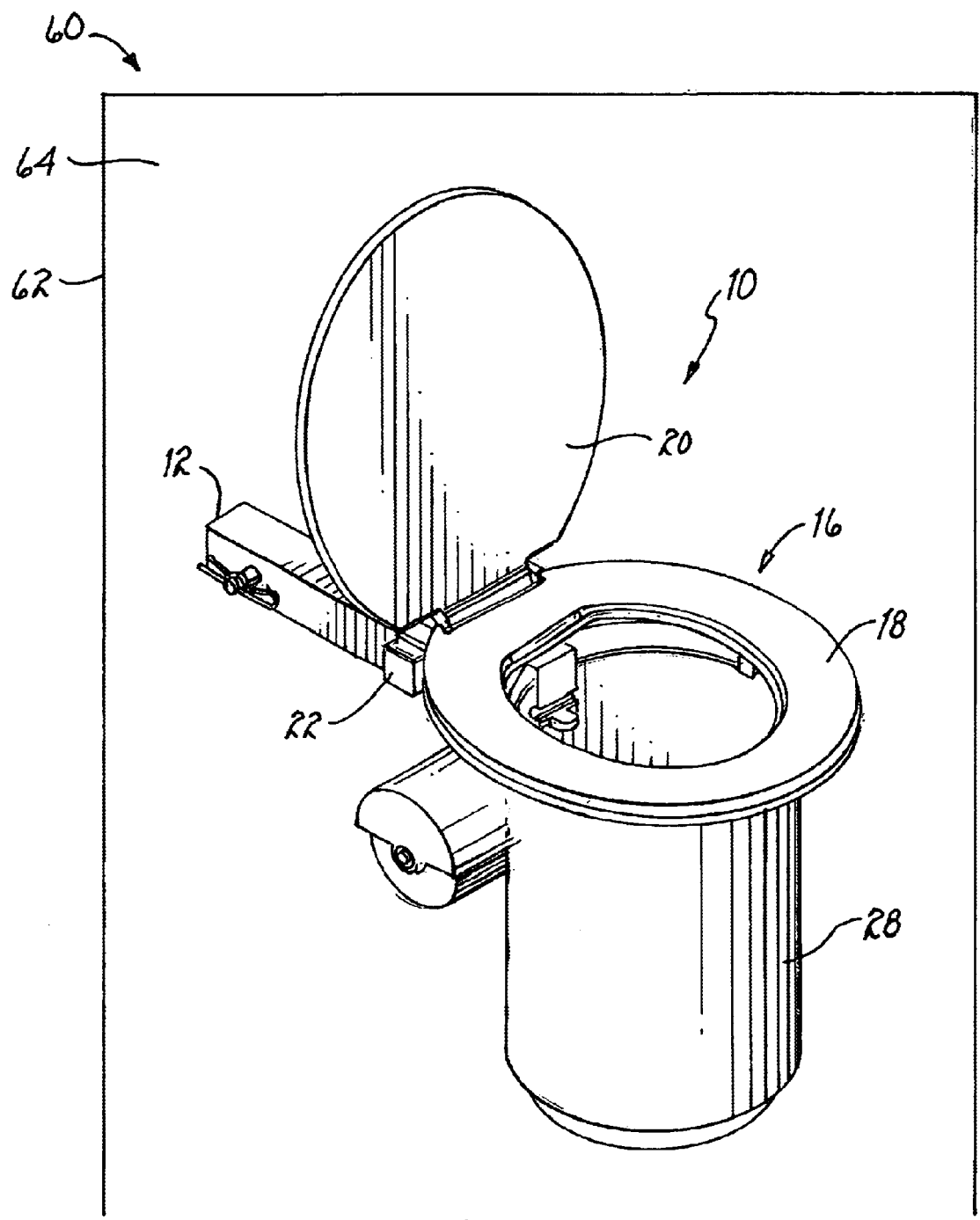
FIG. 1 shows an elevated perspective view of the portable toilet which may be mounted on a trailer hitch and which has a portable ambidextrous, retractable, accessory toilet tissue holder.
Figure 2:
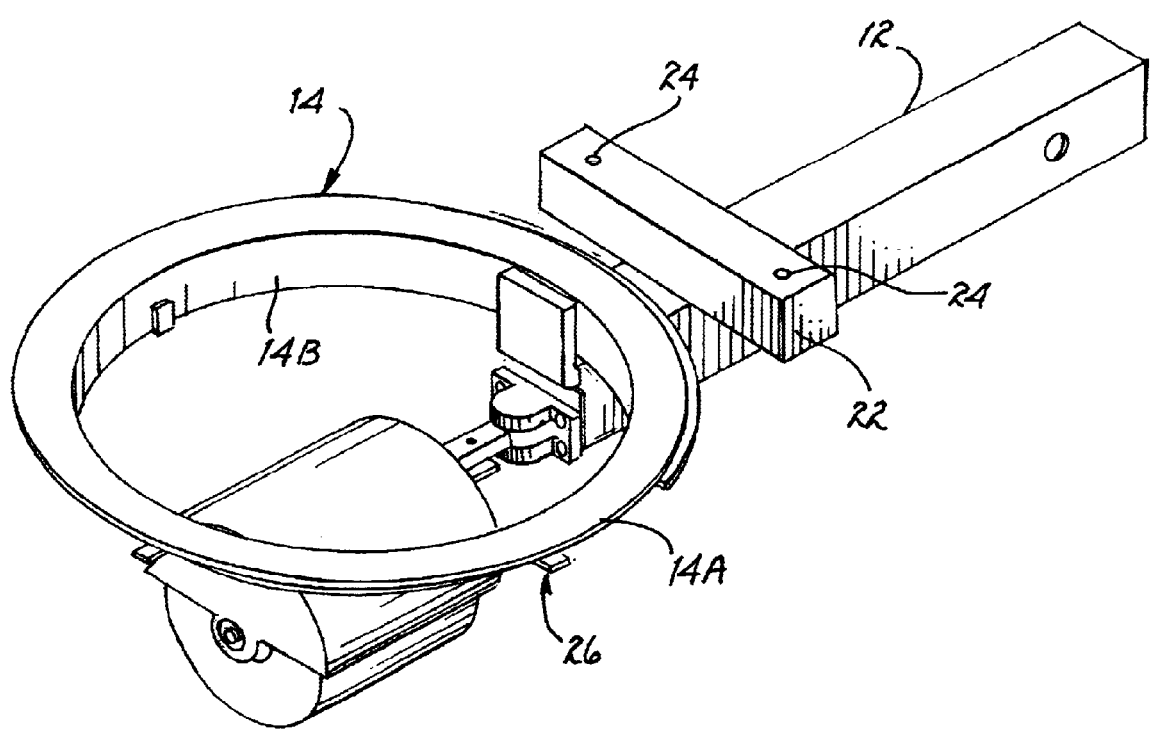
FIG. 2 shows an elevated perspective view of the portable toilet which may be mounted on a trailer hitch and which has a portable ambidextrous, retractable, accessory toilet tissue holder with the toilet seat assembly removed and the toilet tissue holder moved to a central location.
Figure 3:
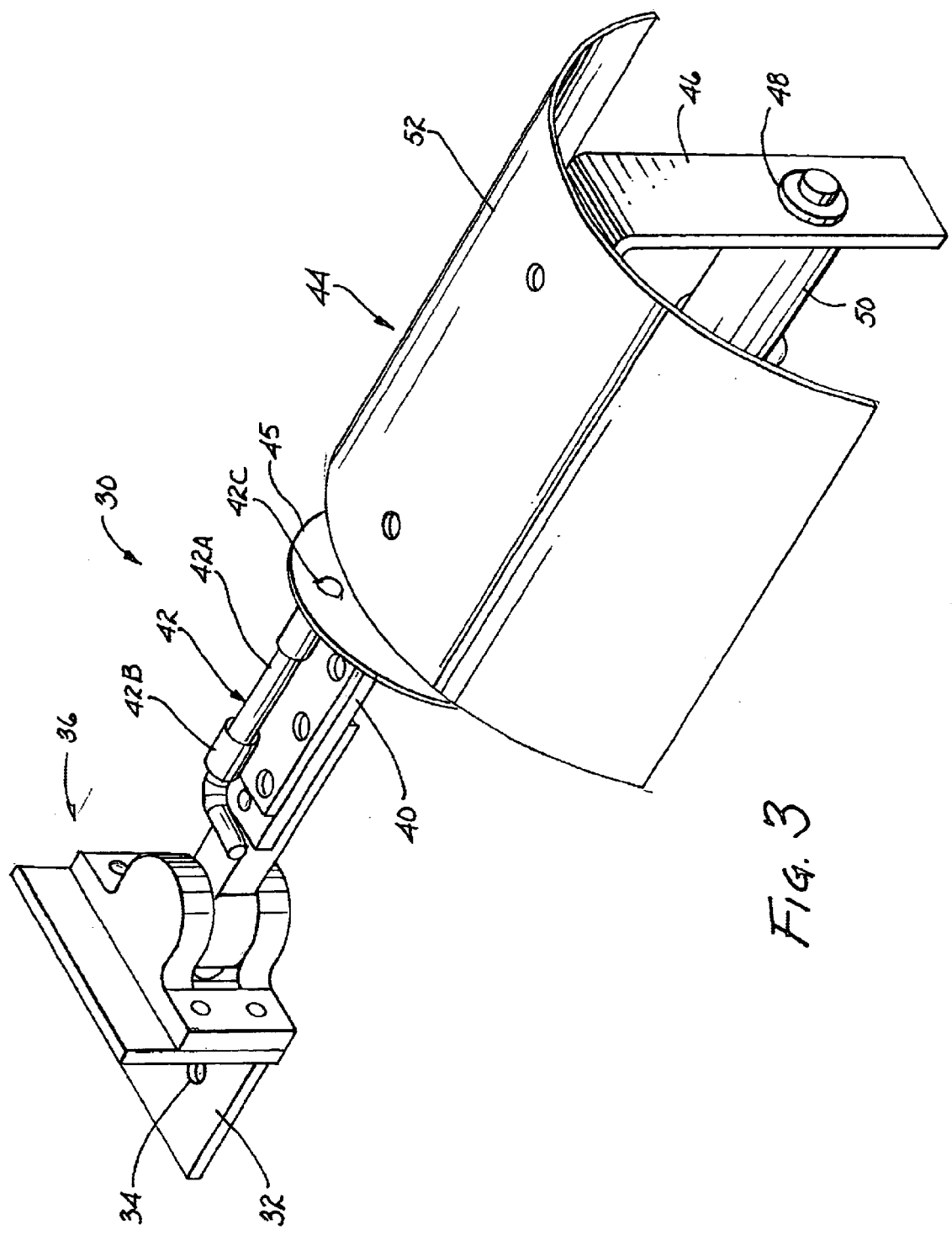
FIG. 3 shows an elevated perspective view of the ambidextrous, retractable, accessory toilet tissue holder.
Figure 4:
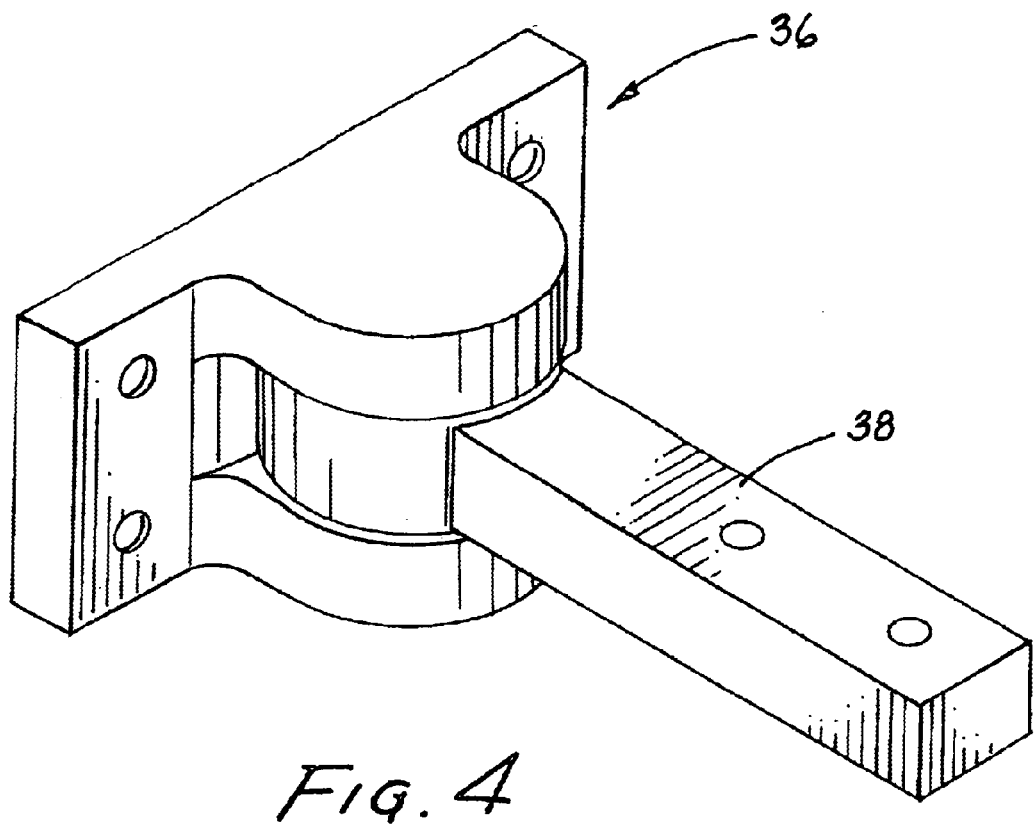
FIG. 4 shows an elevated perspective view of the rotating arm of the ambidextrous, retractable, accessory toilet tissue holder.
Figure 6:
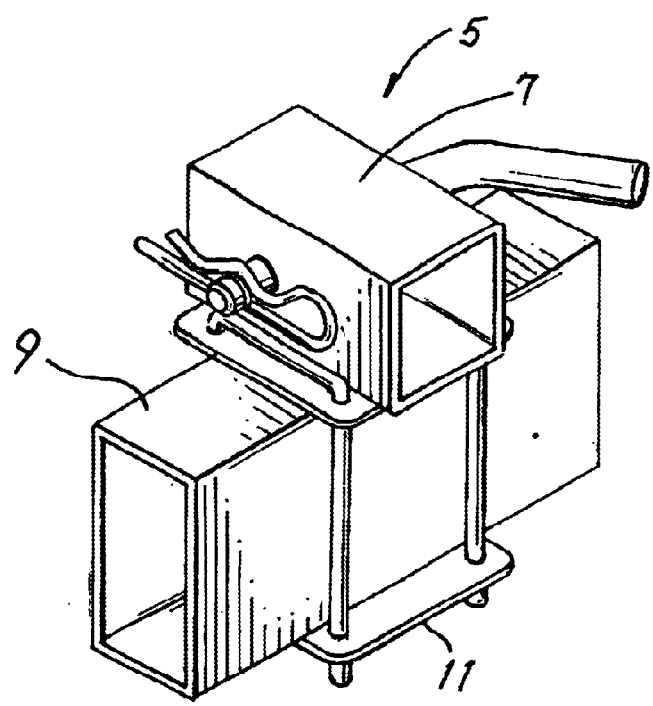
FIG. 6 is an elevated perspective view of an adapter used to hold the portable toilet on a trailer tongue.

It should be noted that in order to attach the portable toilet 10 to a trailer tongue 9, an adapter 5 as shown in FIG. 6 needs to be used. The adapter 5 will be coupled to the trailer tongue 9 by a clamping device 11. A support tube 7 is coupled to the clamping device 11. The support tube is where the portable toilet 10 is inserted and held.

The portable toilet 10 has a support stem 12. The support arm is generally made from steel, aluminum, or other strong and light weight metals. The support stem may further be made of a strong plastic material. The listing of the above materials should not be seen as to limit the scope of the present invention. A base ring 14 is coupled to the support stem. The base ring 14 is used to support a toilet seat assembly 16, as well as for the temporary attachment of a disposable waste collection bag 28. The base ring 14 is generally made from the same material as the support stem 12. Thus, steel, aluminum, other strong and light weight metals, plastic and the like may be used. Again, the listing of the above materials should not be seen as to limit the scope of the present invention. In accordance with one embodiment of the present invention, the base ring 14 is comprised of a circular or oval shaped ring member 14A. A rim member 14B extends down from the ring member 14A and extends along the entire circumference of the ring member.

The base ring 14 may be coupled to the support stem 12 in a plurality of different manners. The base ring 14 may be welded to the support stem, coupled together using one or more bolts, coupled together with a hinge device to allow one to fold the portable toilet 10 for compact storage and transportation, etc. Other ways of coupling the base ring 14 to the support stem 12 may be done without departing from the spirit and scope of the present invention.

A toilet seat assembly 16 is generally coupled to the base ring 14 and the support stem 12. The toilet seat assembly 16 generally comprises a toilet seat 18. The toilet seat 18 is for a user to sit on while using the portable toilet 10. A lid 20 may be coupled to the toilet seat 18. The lid 20 is used to close the portable toilet 10. When the lid 20 is closed, one may sit on the lid and use the portable toilet 10 as a seat. A cross member 22 is generally coupled to the support stem 12. The cross member 22 is generally coupled in a position perpendicular to the support stem 12. One or more holes 24 are formed on the cross member 22. The holes are used to couple the toilet seat assembly 16 to the support stem 12 with a bottom section of the toilet seat resting on the base ring 14.

The base ring 14 will have an attachment device 26 coupled thereto. The attachment device 26 is used to removably couple a disposable waste collection bag 28 to the base ring 14. The collection bag 28 may be any type of commonly used garbage bag. In accordance with one embodiment of the present invention, the attachment device 26 is coupled to the rim member 14B of the base ring 14. The attachment device 26 may be one or more hooks, clips, hook and loop material, tape, bungee cord, rubber band, and the like. The listing of the different types of attachment devices 26 should not be seen as to limit the scope of the present invention.

A portable ambidextrous, retractable, accessory toilet tissue holder 30 (hereinafter tissue holder 30) is coupled to the support stem 12. The tissue holder 30 is able to be move and locked in a plurality of different positions. For example, the tissue holder can be moved to the right side of the base ring 14, to the left side of the base ring 14, and in the center of the base ring. The tissue holder 30 may be made of a plurality of different material. Strong light weight metals like brass, steel, aluminum, and the like may be used. Plastic, fiberglass, and other like materials may also be used. It should be noted that the listing of the above materials should not be seen as to limit the scope of the present invention. The tissue holder 30 may be made of other materials without departing from the spirit and scope of the present invention.

The tissue holder 30 has a base plate 32. The base plate 32 is used to secure the tissue holder 30 to the support stem 12. The base plate 32 may have one or more holes 34. The holes 34 are used to removably couple the tissue holder 30 to the support stem 12. In general, the hole 34 are aligned with corresponding holes in the support stem 12. Some type of coupling device like a screw, rivet, or the like are then used to removably couple the tissue holder 30 to the support stem 12.

Figure 5:
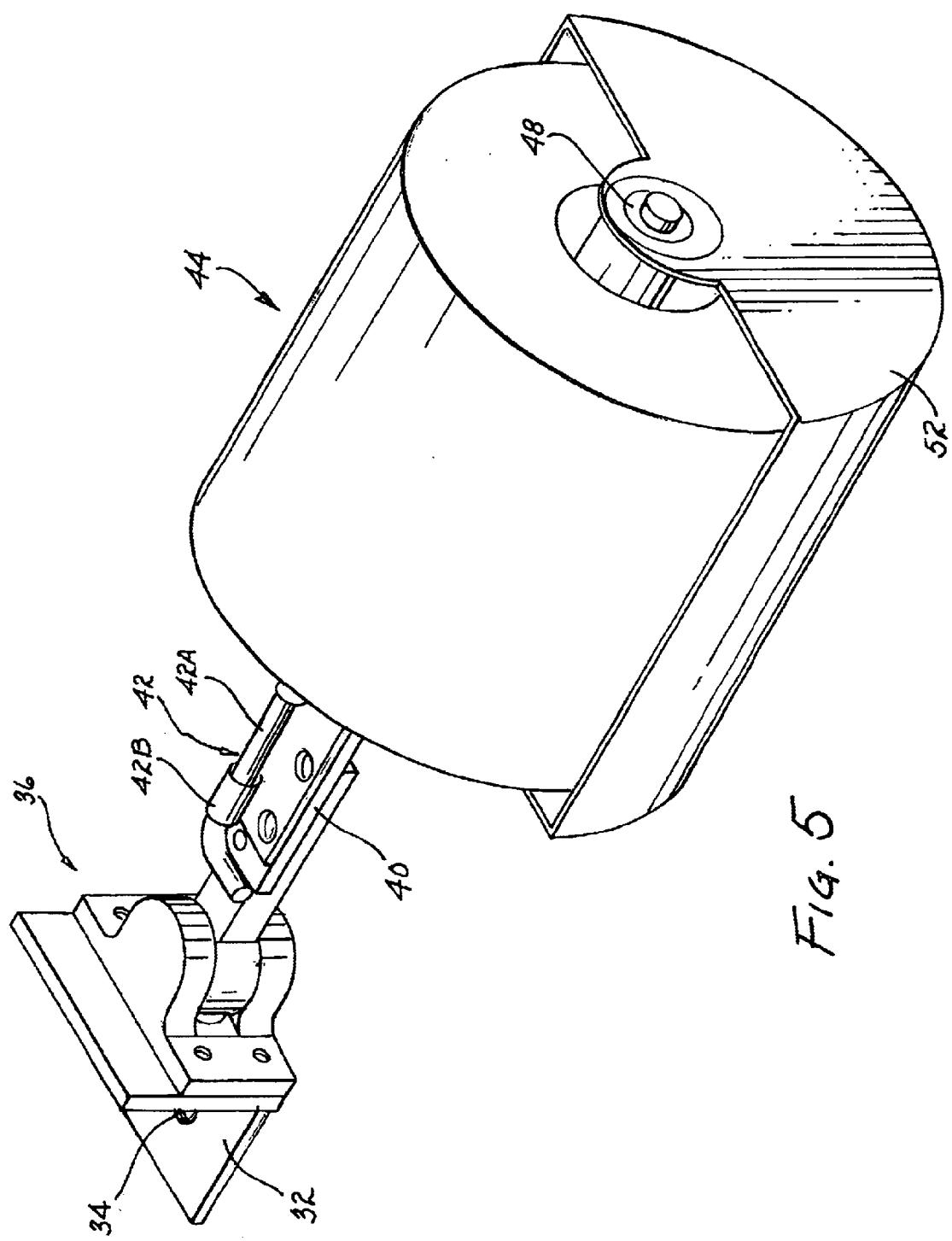
FIG. 5 shows an elevated perspective view of the ambidextrous, retractable, accessory toilet tissue holder with the tissue holder rotated in a stored position.

A latch mechanism 36 is coupled to the base plate 32. The latch mechanism 36 will have an arm member 38 which may be moved and locked in a plurality of different positions. A disc member 40 is coupled to the arm member 38. The disc member 40 will allow the tissue holder 30 to be deployed in an upward, retracted and stowed positioned or a downward deployed position where the tissue holder 30 would be available for use. The disc member 40 will further allow a tissue holder assembly 44 to be rotated as shown more clearly in FIG. 5. The disc member 40 will have a locking device 42. The locking device 42 is used for locking the disc member 40 in a desired position. In accordance with one embodiment of the present invention, the locking device 42 is comprised of a locking pin 42A. The locking pin 42A is movably coupled to the disc member 40 through a channeling 42B. In order to lock the disc member 40 in an upward or downward position, the locking pin 42A is inserted through an opening 42C of a tissue holder assembly 44 which is coupled to the disc member 40.

The tissue holder assembly 44 has a mounting plate 45. The mounting plate 45 is coupled to the hinged member 40. The mounting plate 45 has an opening 42C which is used to lock the tissue holder assembly 44 in a downward position. A bracket member 46 is coupled to the mounting plate 45. The bracket member 46 will have an opening 48 located on each side. The opening 48 are used to mount a tissue roll holder 50. A protective cover 52 is coupled to the bracket member 46. The protective cover 52 serves two purposes. First, the protective cover 52 is used to protect the tissue roll from the elements which may damage the tissue roll. Second, the protective cover 52 is used to protect and shield the tissue roll from damage when the tissue holder assembly 44 is in an upward retracted position.

The portable toilet 10 may have a privacy enclosure 60. The privacy enclosure 60 would provide two purposes. First, the privacy enclosure 60 would shelter a user form the environment (i.e., rain, snow, snow, wind, etc.). More importantly, the privacy enclosure 60 will allow one to use the portable toilet 10 without having to be worried about others seeing them. The privacy enclosure 60 would have a frame member 62. The frame member in general will surround the portable toilet. A cover 64 is then placed over the frame 62 (similar to a tent). The cover 64 will have an opening for allowing one access to the portable toilet 10. The opening will generally have a flap member which can be coupled to the cover in order to fully enclose the privacy enclosure 60. In the interior of the privacy enclosure 60, the cover 64 may have a plurality of pockets for storing items.

Operation

The support stem 12 is inserted into a trailer hitch or the support tube 7 of the adapter 5. The support stem 12 may have one or more attachment devices to allow the portable toilet 10 to fit into any size trailer hitch. A hitch pin or similar device is inserted through the support stem to prevent accidental disengagement from the trailer hitch.

The tissue holder 30 is moved in a downward position by moving the hinged member 40 downward. The tissue holder 30 is then locked in the downward position by moving the locking pin 42A so that the locking pin 42A is inserted through an opening 42C of the tissue holder assembly 44. One may then move the tissue holder 30 to the right or left side of the portable toilet 10 by moving the arm member 38 of the tissue holder 30.

A collection bag 28 is then coupled to the rim member 14B of the base ring 14. The collection bag 28 is coupled to the rim member 14B by one or more attachment devices 26.

The frame of the privacy enclosure may then be positioned over the portable toilet 10. The cover is then placed over the frame and the portable toilet 10 is ready for use.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A portable toilet comprising:
   a support stem which may be inserted into a trailer hitch;
   a base ring coupled to the support stem;
   attachment device coupled to the base ring for removably coupling a waste collection bag to the portable toilet;
   a toilet seat assembly coupled to the support stem and resting on the base ring; and
   a multi positional toilet paper holder coupled to the support stem, wherein the multi positional toilet paper holder comprises:
      a base plate coupled to the support stem;
      multi positional latch coupled to the base plate wherein the multi positional latch has an arm member which may be moved and locked in a plurality of positions;
      a tissue holder assembly; and
      a hinge member coupled to the tissue holder assembly and the multi positional latch for moving the tissue holder assembly in an upward retracted position and a lowered deployed position.

2. A portable toilet in accordance with claim 1 wherein the base ring comprises:
   an oval shaped ring member; and
   a rim member extending down from the ring member and extending along the entire circumference of the ring member.

3. A portable toilet in accordance with claim 1 further comprising a cross member coupled to the support stem for coupling the toilet seat assembly to the support stem.

4. A portable toilet in accordance with claim 1 wherein the toilet seat assembly comprises:
   a toilet seat having a bottom section which rests on the base ring; and
   a lid member coupled to the toilet seat.

5. A portable toilet in accordance with claim 1 wherein the multi positional toilet paper holder further comprises a locking device coupled to the hinged member for locking the tissue holder assembly in the upward retracted position and in the lowered deployed position.

6. A portable toilet in accordance with claim wherein the tissue holder assembly comprises:
   a mounting plate coupled to the hinge member;
   at least one opening formed in the mounting plate for locking the tissue holder in the upward retracted position and in the lowered deployed position;
   a bracket coupled to the mounting plate wherein the bracket has an opening formed on each side of the bracket; and
   a tissue roll holder positioned in the openings formed on both sides of the bracket.

7. A portable toilet in accordance with claim 6 wherein the tissue holder assembly further comprises a cover coupled to the bracket for protecting a tissue roll from getting damaged.

8. A portable toilet comprising:
   a support stem which may be inserted into a trailer hitch;
   a base ring coupled to the support stem wherein the base ring comprises:
      an oval shaped ring member; and
      a rim member extending down from the ring member and extending along the entire circumference of the ring member;
   attachment device coupled to the base ring for removably couplinq a waste collection bag to the portable toilet;
   a toilet seat assembly coupled to the support stem and resting on the base ring;
   a cross member coupled to the support stem for coupling the toilet seat assembly to the support stem; and
   a multi positional toilet paper holder coupled to the support stem wherein the multi positional toilet paper holder comprises:
      base plate coupled to the support stem;
      multi positional latch coupled to the base plate wherein the multi positional latch has an arm member which may be moved and locked in a plurality of positions;
      a tissue holder assembly; and
      a hinge member coupled to the tissue holder assembly and the multi positional latch for moving the tissue holder assembly in an upward retracted position and a lowered deployed position.

9. A portable toilet in accordance with claim 8 wherein the toilet seat assembly comprises:
   a toilet seat having a bottom section which rests on the base ring; and
   a lid member coupled to the toilet seat.

10. A portable toilet in accordance with claim 8 wherein the multi positional toilet paper holder further comprises a locking device coupled to the hinged member for locking the tissue holder assembly in the upward retracted position and in the lowered deployed position.

11. A portable toilet in accordance with claim 8 wherein the tissue holder assembly further comprises a cover coupled to the bracket for protecting a tissue roll from getting damaged.

* * * * *